(12) United States Patent
Tzung-Shiun

(10) Patent No.: US 7,563,015 B2
(45) Date of Patent: Jul. 21, 2009

(54) BACK LIGHT MODULE

(76) Inventor: Tsai Tzung-Shiun, No. 9, Ta-Yo 1st Street, Tah Liao Hsiang, Kaohsiung Shien (TW)

( * ) Notice: Subject to any disclaimer, the term of this patent is extended or adjusted under 35 U.S.C. 154(b) by 55 days.

(21) Appl. No.: 11/707,242

(22) Filed: Feb. 16, 2007

(65) Prior Publication Data
US 2008/0198622 A1    Aug. 21, 2008

(51) Int. Cl.
*F21V 7/04* (2006.01)
(52) U.S. Cl. .................. 362/633; 362/606; 362/622; 362/624
(58) Field of Classification Search .............. 362/600, 362/606, 615, 621–627, 632–633; 349/64–65
See application file for complete search history.

(56) References Cited
U.S. PATENT DOCUMENTS
5,677,746 A * 10/1997 Yano ........................ 349/58
5,729,310 A * 3/1998 Horiuchi et al. ............ 349/62
7,237,941 B2 * 7/2007 Hsieh et al. ................ 362/633
2006/0250820 A1 * 11/2006 Kuo ........................... 362/623

\* cited by examiner

*Primary Examiner*—Sandra L O'Shea
*Assistant Examiner*—Jason Moon Han
(74) *Attorney, Agent, or Firm*—Wang Law Firm, Inc.; Li K. Wang

(57) ABSTRACT

A back light module includes a frame body, a back board, a reflecting sheet, a light-guiding plate, a lighting member, an optical film and an upper cover. The frame body and the back board are formed integral. The frame body has its outer peripheral edge formed with lots of radiating fins, and the back board and the radiating fins are respectively disposed with numerous radiating grains for increasing the heat dissipation area and elevating heat dissipation effect of the back light module, able to effectively lower the working temperature and prolong the service life of the lighting member, and elevate the working efficacy of the lighting member and economize cost.

11 Claims, 4 Drawing Sheets

BACK LIGHT MODULE

BACKGROUND OF THE INVENTION

1. Field of the Invention

This invention relates to a back light module, particularly to one formed with a multi-layer structure and having the outer side of its frame body and back board provided with numerous radiating fins and radiating grains for increasing the heat-dissipating area of the back light module, having excellent effect in heat dissipation.

2. Description of the Prior Art

A conventional back light module, as shown in FIG. 1, is formed with a multi-layer structure, which is composed from bottom to top of a reflecting sheet, a light-guiding plate, a diffusing plate and a prism sheet. The light-guiding plate has its peripheral side installed with cold cathode fluorescent lamps (CCFL) and light emitting diodes (LED) and its bottom surface provided with reflecting net points. This multi-layer structure is engaged in an outer frame and then mounted on a bottom board to make up the back light module. The light-guiding plate of the conventional back light module is disposed with a mirror surface, and the diffusion plate and the prism sheet are respectively bored with through holes for presenting the mirror surface of the light-guiding plate.

The conventional back light module is provided with the mirror surface, and the CCFLs or the LEDs installed at the peripheral side of the light-guiding plate as a light source to be scattered by the reflecting net points at the bottom surface of the light-guiding plate. And then the light reflected to the topside of the light-guiding plate by the reflecting sheet for reinforcing the lighting at the peripheral side of the mirror surface and increasing irradiation effect on the mirror surface. Generally, the outer frame of the conventional back light module is made of plastic molded in shape to lighten the back light module, and the luminous intensity of the light source has to be elevated for making clear the image on the back light plate. Thus, the heat energy produced by the light source will be relatively heightened and the outer frame will receive a certain extent of heating effect, and since the plastic outer frame has bad effect in heat dissipation; therefore, the CCFLs and LEDs are likely to be damaged due to bad heat dissipation. In addition, only through the light-guiding plate and the diffusion sheet and the prism plate, can the CCFLs and LEDs increase irradiation effect on the mirror; therefore, the conventional back light module needs to increase its structural layers in order to make images clear, thus complicating manufacturing processes.

SUMMARY OF THE INVENTION

The objective of the invention is to offer a back light module including a frame body, a back board, a reflecting sheet, a light-guiding plate, a lighting member, an optical film and an upper cover. The frame body and the back board can be formed integral or independent. The frame body has its central portion formed with an depositing space for receiving therein the reflecting sheet, the light-guiding plate and the optical film, and the lighting member is positioned at the inner peripheral edge of the frame body and firmly bonded with the frame body by means of radiating paste, having one end provided with a connector for connecting an external power unit. The frame body has its outer peripheral edge disposed with lots of radiating fins, and the back board and the radiating fins are respectively formed with numerous radiating grains for increasing the heat dissipation area of the back light module. In addition, the frame body and the back board have parts of the outer side bored with depositing recesses for receiving a PCB and its IC chips and other passive elements.

The frame body and the back board of the back light module of this invention are made of aluminum; therefore, the frame body of this invention is much better than the conventional plastic frame body in hardness and heat conduction as well as in heat dissipation. Further, the back light module of this invention is provided with numerous radiating fins and radiating grains for increasing the heat dissipation area of the back light module, able to effectively conduct and dissipate high temperature generated by the lighting member. Therefore, the lighting member of this invention can make electrical connection with comparatively high electric current for elevating its brightness and its working efficacy. Furthermore, the back light module of this invention has excellent effect in heat dissipation, able to prolong the service life of the lighting member and lower the cost of replacing lighting members with new ones.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
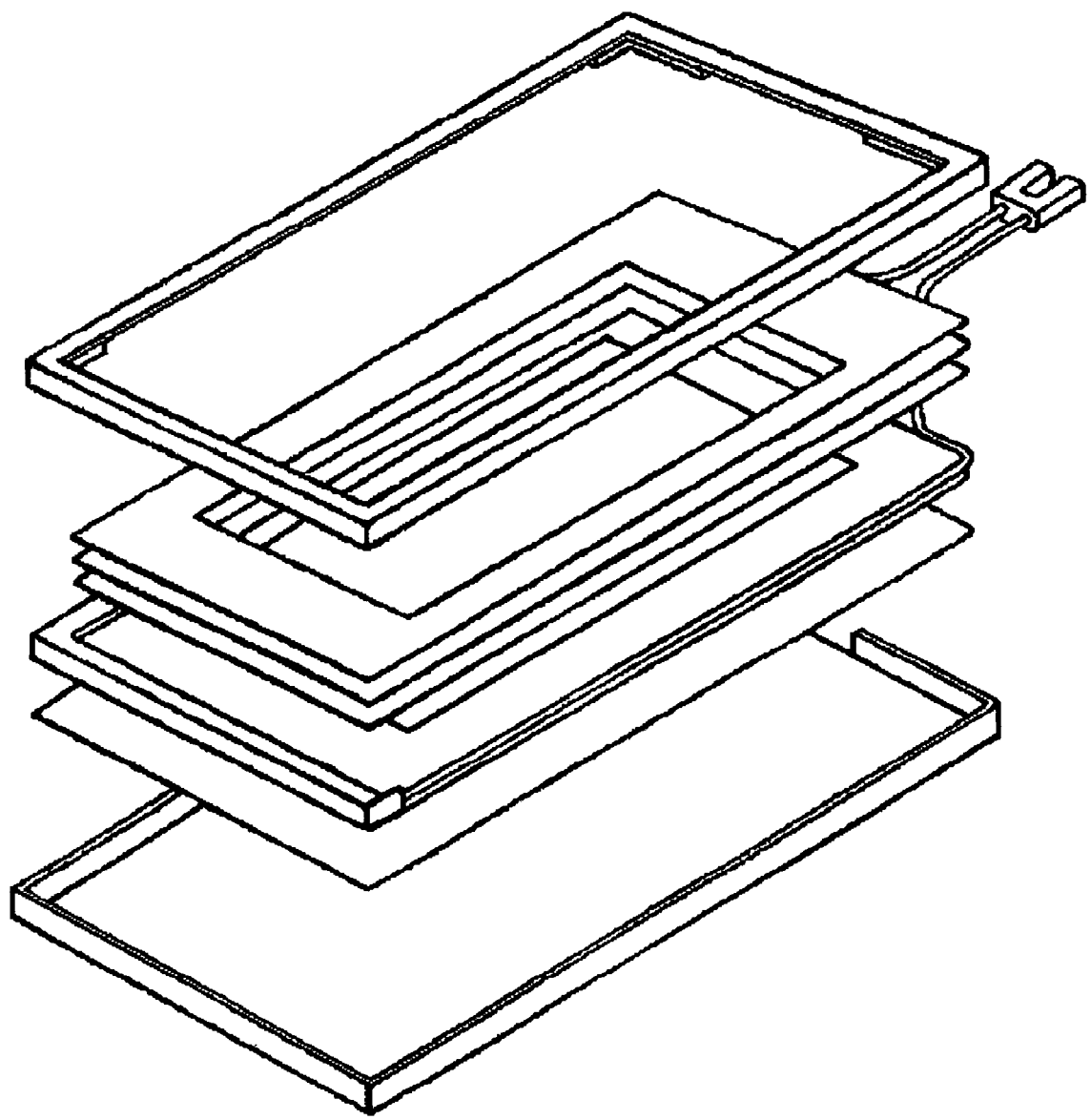
FIG. 1 is an exploded perspective view of a conventional back light module.
Figure 2:
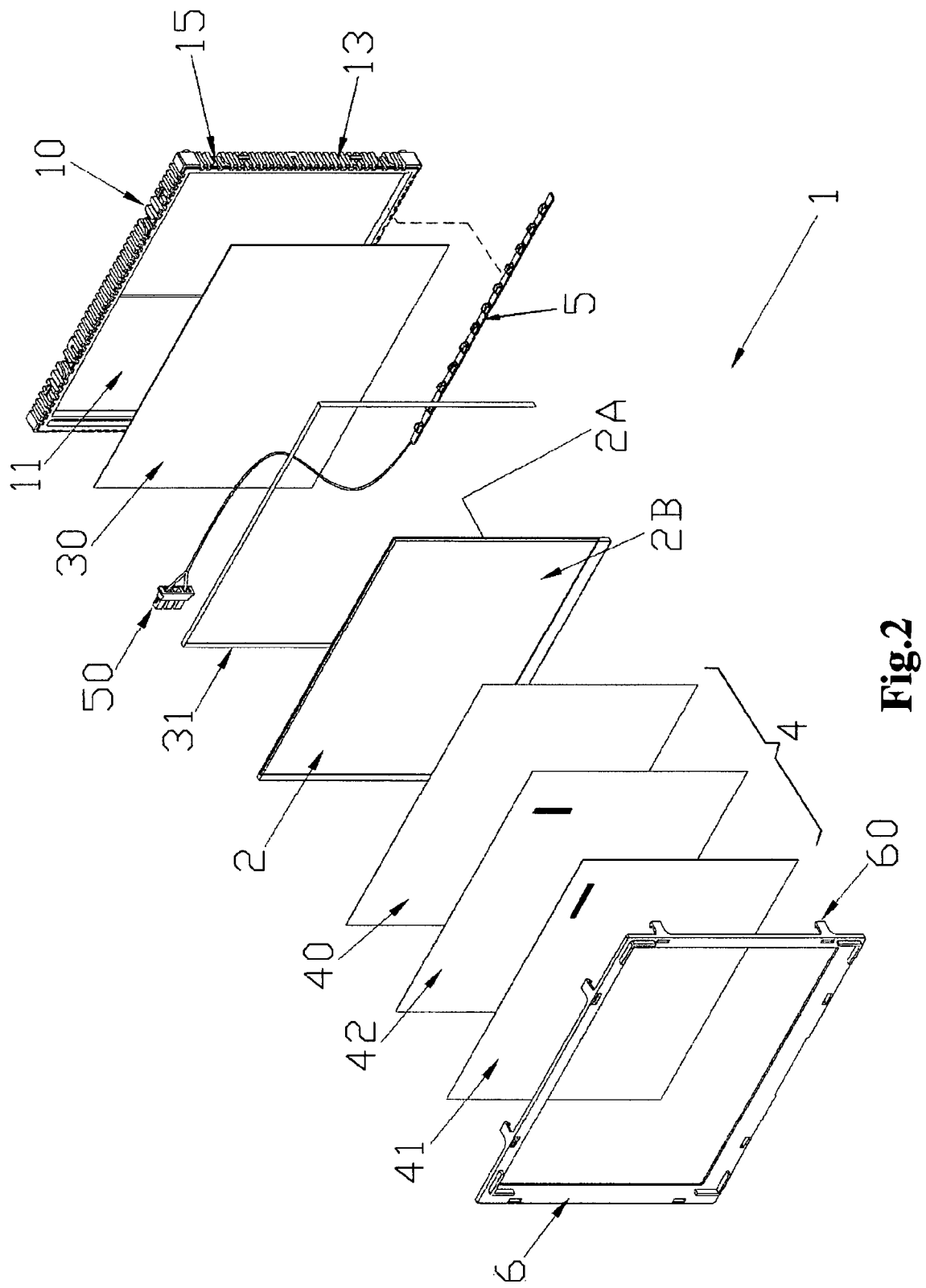
FIG. 2 is an exploded perspective view of a back light module in the present invention.
Figure 4:
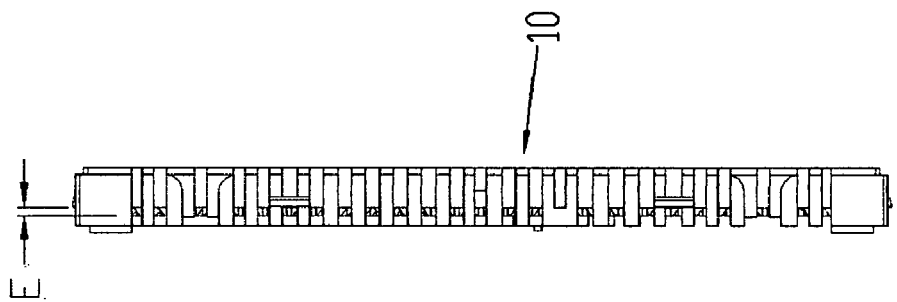
FIG. 4 is a side cross-sectional view of the frame of the back light module in the present invention.
Figure 3:
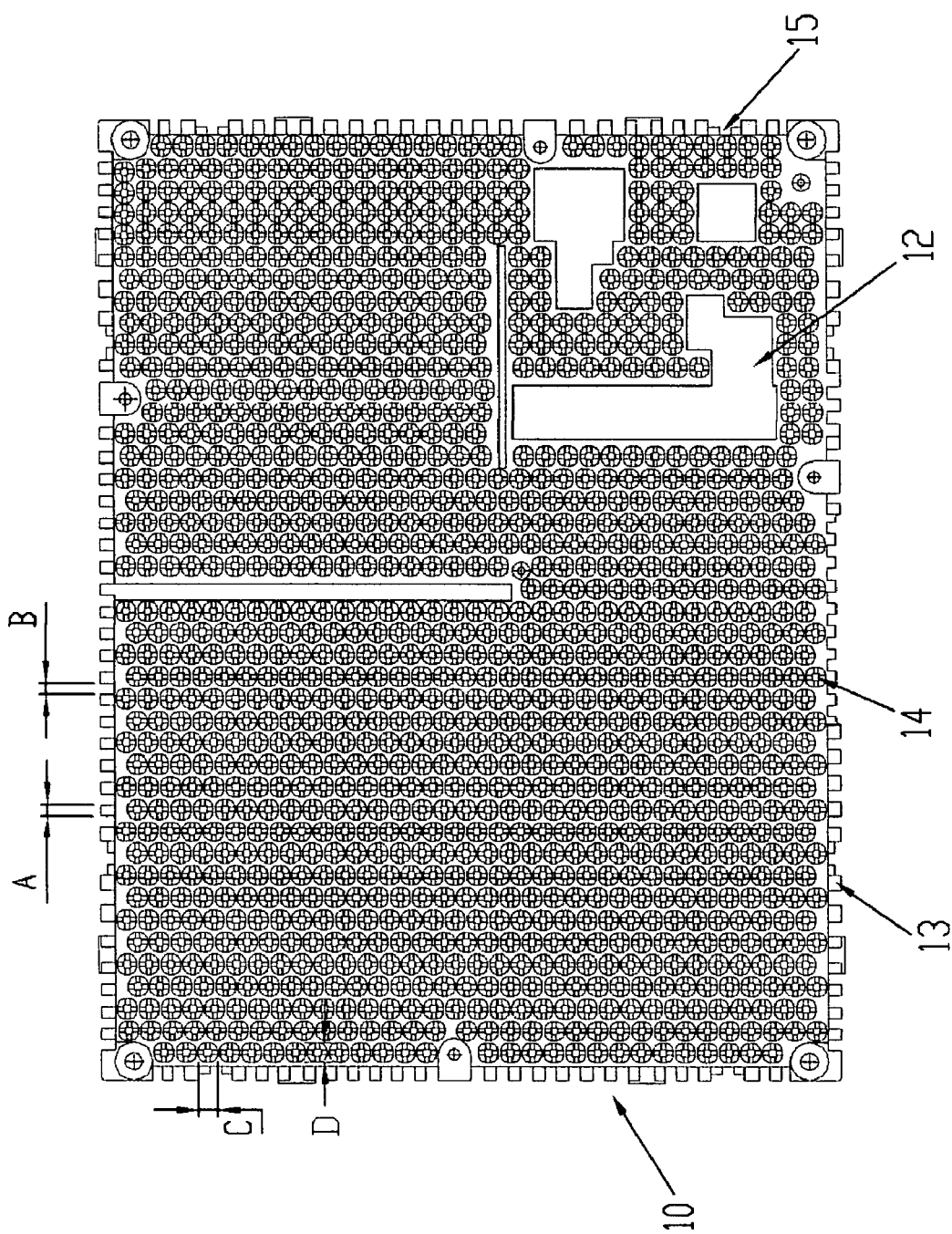
FIG. 3 is a rear view of the frame of the back light module in the present invention.

A preferred embodiment of a back light module 1 in the present invention, as shown in FIGS. 2, 3 and 4, includes a frame body 10, a back board 11, a reflecting sheet 30, a light-guiding plate 2, an optical film 4, a lighting member 5 and an upper cover 6 as main components combined together. The frame body 10 and the back board 11 can be formed integral or independent from each other. The frame body 10 has its central portion formed with depositing space for receiving therein the reflecting sheet 30, the light-guiding plate 2 and the optical film 4, which consists of a diffusion sheet 40, an upper prism 41 and a lower prism 42. The outer upper cover 6 is provided with engage members to be respectively engaged with the engage notches 15 of the frame body 10 to combine the upper cover 6 and the frame body 10 together for fixing and protecting the light-guiding plate 2 and other members in the frame body 10. Further, the frame body 10 has its outer peripheral edge formed with lots of serrated radiating fins 13, and the back board 11 and the radiating fins 13 are respectively provided with numerous serrated radiating grains 14 for increasing the heat dissipation area of the back light module 1. Furthermore, the frame body 10 and the back board 11 has parts of their outer side bored with depositing recesses 12 for receiving and protecting a PCB and its IC chips and other passive elements therein. In addition, the frame body 10 has one inner edge installed with the lighting member 5 installed thereon with a plurality of high power LEDs that are tin soldered on an aluminum-sheet PCB, and then the PCB is combined with the frame body 10 by means of heat-dissipating paste.

The light-guiding plate 2 has one inner edge formed with a transparent portion corresponding with the location of the lighting member 5 and other edges formed with opaque portions respectively stuck thereon with a reflecting strip 31. Further, the light-guiding plate 2 has one side formed with a net-shaped surface (2A) formed thereon with numerous net points, and the other side formed with a mirror-like smooth surface (2B). The reflecting sheet 30 is positioned between the net-shaped surface (2A) of the light-guiding plate 2 and the frame body 10, and the optical film 4 is stuck on the smooth surface (2B) of the light-guiding plate 2, composed of the diffusion sheet 40 abutting on the light-guiding plate 2, the upper prism 41 and the lower prism 42.

Thus, a back light module able to carry out image formation and lighting is made by combining the frame body 10 with the light-guiding plate 2 and its reflecting strips 31 on the edges, the reflecting sheet 30 and the optical film 4 respectively stuck on the opposite sides of the light-guiding plate 2, and the lighting member 5 for emitting light source to pass through the transparent portion of the light-guiding plate 2 and be refracted in the interior of the light-guiding plate 2. The upper and the lower prism 41, 42 of the optical film 4 are provided for enabling the back light module 1 to carry out image indication with excellent effect, and the prisms 41, 42 can be increased or reduced in number according to customers' requirements and consideration of cost.

Figure 5:
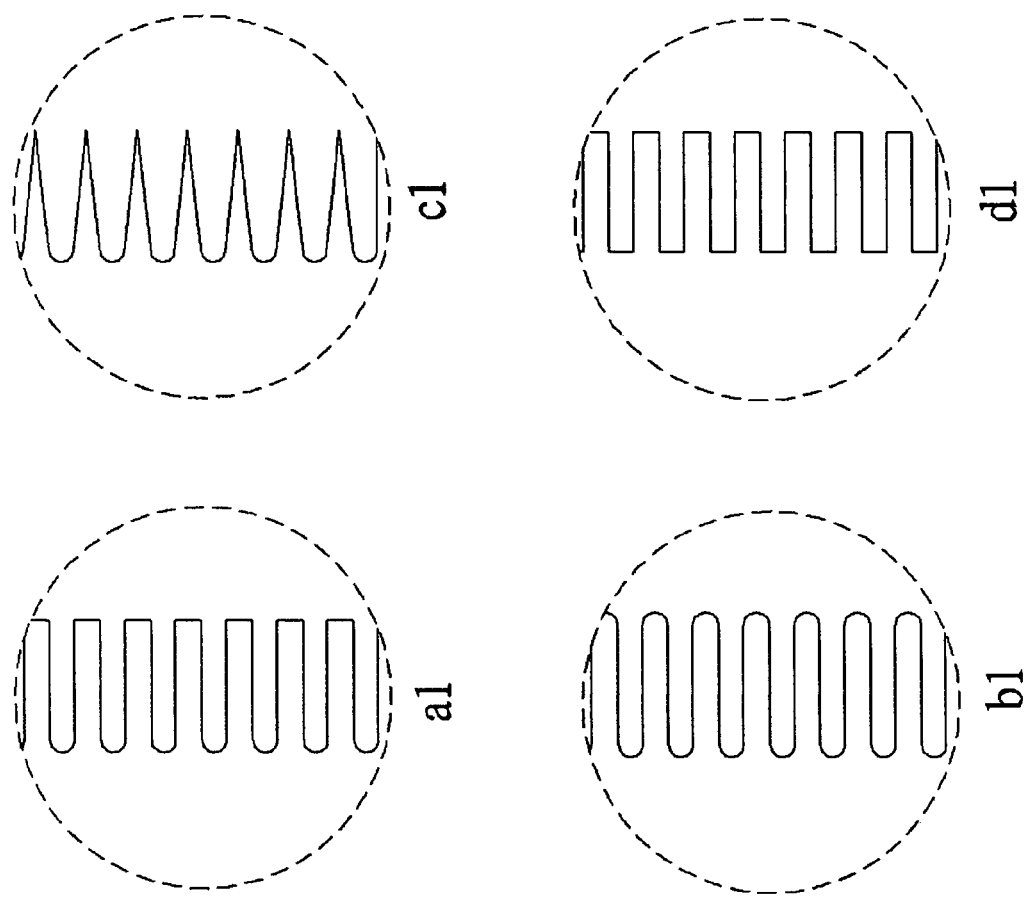
FIG. 5 is a front view of radiating fins and various shapes of their notches in the present invention.
Figure 5:
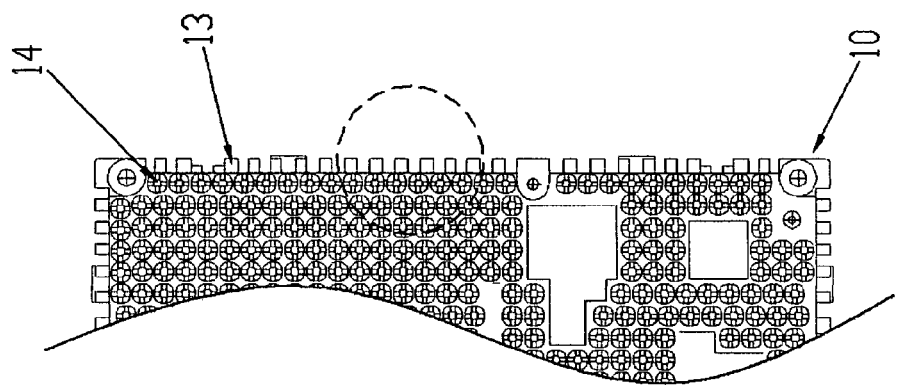

The feature of this invention is the numerous radiating fins 13 with serrated recesses formed at the outer peripheral edge of the frame body 10 and the numerous serrated radiating grains 14 disposed on the back board 11. The bottom and the outer edge of the recess between every two radiating fins 13 can be formed into a round shape, as shown in FIGS. (a1) and (b1) of FIG. 5, or a pointed shape, as shown in FIG. (c1) of FIG. 5, or a rectangular shape, as shown in FIG. (d1) of FIG. 5. Moreover, referring to FIGS. 3 and 4, after a research, the inventor of this invention reached a conclusion that if the width (A) of the radiating fin 13 is within 10 mm, and the width (B) of the recess between two radiating fins 13 is within 10 mm, the back light module of this invention may obtain an excellent effect in heat dissipation. Similarly, the length (C), the width (D) and the height (E) of the radiating grain 14 of this invention are respectively designed to be within 10 mm; therefore, such radiating grains 14 will be best protected and can carry out heat dissipation with excellent effect. Provided with numerous radiating fins 13 and the radiating grains 14, the back light module of this invention can increase its heat dissipation area and elevate its heat dissipation efficiency, able to quickly and effectively lower the working temperature of the lighting member 5 and prolong the service life of the LEDs.

Provision of the radiating fins 13 and the radiating grains 14, and the shaping specifications of the back board 11 of this invention can be planned in accordance with the requirements of customers. For instance, the back board 11 can be formed with a size as large the area surrounded by the frame body 10, or formed with a size a half, one third or one sixth as large as the area surrounded by the frame body 10, depending on customers' requirements in the respect of heat dissipation.

Subsequently, aluminum is harder than plastic, and is excellent in heat conduction and heat dissipation. The frame body 10 and the back board 11 of the back light module 1 of this invention are made of aluminum; therefore, they not only can protect and position the lighting member 5, the light-guiding plate 2 and other members installed in the interior of the frame body 10, but also can exhaust out heat energy produced by the lighting member 5 and conducted to the frame body 10 and the back board 11 through the aluminum PCB and the bonding radiating paste. In addition, for consideration of cost and the requirements of customers, the frame body 10 and the back board 11 or the PCB of this invention can be made of aluminum-magnesium alloy or pottery or porcelain, equally having good effect in heat conduction and heat dissipation.

Furthermore, after the aluminum frame body 10 and the back board 11 of this invention are shaped, their surfaces can be anodized to let the surface of the frame body 10 and the back board 11 formed with a protective layer that has good effect in insulation, able to prevent electric conduction and elevate visual beauty.

As can be understood from the above description, this invention has the following advantages.

1. Compared with the plastic frame body of the conventional back light module, the frame body and the back board of the back light module of this invention, which are made of aluminum or aluminum-magnesium alloy, are much better in heat conduction and heat dissipation as well as in hardness, able to effectively protect and position the light-guiding plate and other members positioned in the frame body as well as the PCB and its IC chips and other passive elements in the depositing recesses of the frame body 10, thus saving energy and avoiding pollution of an environment.

2. The numerous radiating fins formed at the outer peripheral edge of the frame body, and the numerous radiating grains provided on the back board and the radiating fins are able to increase the heat dissipation area of the back light module, able to quickly scatter and exhaust out the heat energy generated by the LEDs and effectively lower the working temperature and the service life of the LEDs.

3. The back light module 1 of this invention is provided with numerous radiating fins and radiating grains for conducting and dissipating the heat energy produced by the LEDs and prolonging the service life of the LEDs. Therefore, the LEDs can make electric connection with comparatively high electric current for elevating their shining brightness under the condition of not shortening their service life. In addition, the LEDs can be reduced in number and the light-guiding plate can be made thinner so as to economize cost, save energy source and lessen the size, weight and thickness of the back light module.

4. The back light module of this invention uses LEDs instead of conventional electric bulbs for lighting, conforming to requirement of environmental protection.

5. The back light module of this invention is simple in structure, easy in manufacturing and able to attain the desired output of products.

While the preferred embodiment of the invention has been described above, it will be recognized and understood that various modifications may be made therein and the appended claims are intended to cover all such modifications that may fall within the spirit and scope of the invention.

The invention claimed is:

1. A back light module comprising:
   a frame body having a central portion formed with a depositing space and a peripheral edge disposed with radiating heat fins;
   a back board formed integral with said frame body, said back board is provided with heat radiating grains;
   a lighting member which has LEDs assembled on a PCB installed at an inner peripheral edge of said frame body;
   a reflecting sheet positioned in said frame body;
   a light-guiding plate disposed in said frame body and positioned in front of said reflecting sheet, said light-guiding plate having one edge formed with a transparent portion corresponding with a location of said lighting member, said light-guiding plate having other edges respectively formed with an opaque portion, said opaque portion respectively stuck thereon with a reflecting strip;

a diffusion sheet provided in said frame body and positioned before said light-guiding plate; and an upper cover fixedly combined with said frame body by mutual engagement.

2. The back light module as claimed in claim 1, wherein said back board is provided independent.

3. The back light module as claimed in claim 1, wherein the interval between every two said radiating grains and the length, the width and the height of each said radiating grain are respectively within 10 mm.

4. The back light module as claimed in claim 1, wherein said radiating fins are formed with serrated recesses, and the bottom of each said serrated recess and an outer edge of each said radiating fin can be formed into any shape, the depth and the interval between every two said radiating fins being within 10 mm respectively.

5. The back light module as claimed in claim 1, wherein said frame body having a surface anodized after shaped.

6. The back light module as claimed in claim 1, wherein said frame body having a surface treated for insulation after shaped.

7. The back light module as claimed in claim 1, wherein said frame body, said back board, and said radiating fins are made of aluminum.

8. The back light module as claimed in claim 1, wherein said frame body, said back board, and said radiating fins are made of aluminum-magnesium alloy.

9. The back light module as claimed in claim 1, wherein said frame body, said back board, and said radiating fins are made of pottery or porcelain.

10. The back light module as claimed in claim 1, wherein said PCB is made of fiberglass.

11. The back light module as claimed in claim 1, wherein the thickness of said light-guiding plate is within 10 mm.

* * * * *